United States Patent
Tran et al.

(10) Patent No.: US 7,782,649 B2
(45) Date of Patent: Aug. 24, 2010

(54) USING CONTROLLED BIAS VOLTAGE FOR DATA RETENTION ENHANCEMENT IN A FERROELECTRIC MEDIA

(75) Inventors: Quan Anh Tran, Fremont, CA (US); Valluri R. Rao, Saratoga, CA (US); Qing Ma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 11/961,973

(22) Filed: Dec. 20, 2007

(65) Prior Publication Data

US 2009/0161523 A1 Jun. 25, 2009

(51) Int. Cl.
*G11C 11/22* (2006.01)
(52) U.S. Cl. ............ 365/145; 365/80; 365/87; 369/126
(58) Field of Classification Search .......... 365/145, 365/80, 87; 369/126; 977/943, 947
See application file for complete search history.

(56) References Cited

U.S. PATENT DOCUMENTS

| | | | | |
|---|---|---|---|---|
| 6,064,587 A * | 5/2000 | Jo | | 365/145 |
| 6,515,957 B1 * | 2/2003 | Newns et al. | | 369/126 |
| 6,562,633 B2 * | 5/2003 | Misewich et al. | | 438/3 |
| 6,841,220 B2 * | 1/2005 | Onoe et al. | | 428/66.7 |
| 7,050,320 B1 | 5/2006 | Lai et al. | | |
| 7,262,984 B2 * | 8/2007 | Schindler et al. | | 365/145 |
| 7,626,846 B2 * | 12/2009 | Rao et al. | | 365/145 |
| 2008/0012094 A1 * | 1/2008 | Ma et al. | | 257/614 |
| 2008/0089108 A1 * | 4/2008 | Min et al. | | 365/110 |
| 2008/0142859 A1 * | 6/2008 | Ma et al. | | 257/295 |
| 2009/0001338 A1 * | 1/2009 | Franklin et al. | | 257/2 |
| 2009/0003030 A1 * | 1/2009 | Ma et al. | | 365/145 |

* cited by examiner

*Primary Examiner*—Dang T Nguyen
*Assistant Examiner*—Alexander Sofocleous
(74) *Attorney, Agent, or Firm*—Cool Patent, P.C.; Joseph P. Curtin

(57) ABSTRACT

Using controlled bias voltage for data retention enhancement in a ferroelectric media is generally described. In one example, an apparatus includes a ferroelectric film including one or more domains, the ferroelectric film having a first surface and a second surface, the first surface being opposite the second surface, an electrode coupled with the first surface, and an electrically conductive thin film coupled with the second surface wherein the electrically conductive thin film is sufficiently conductive that a controlled bias field applied between the electrically conductive thin film and the electrode is sufficient to grow, shrink, or actively maintain the size of the one or more domains disposed between the electrically conductive thin film and the electrode.

18 Claims, 4 Drawing Sheets

Figure 3
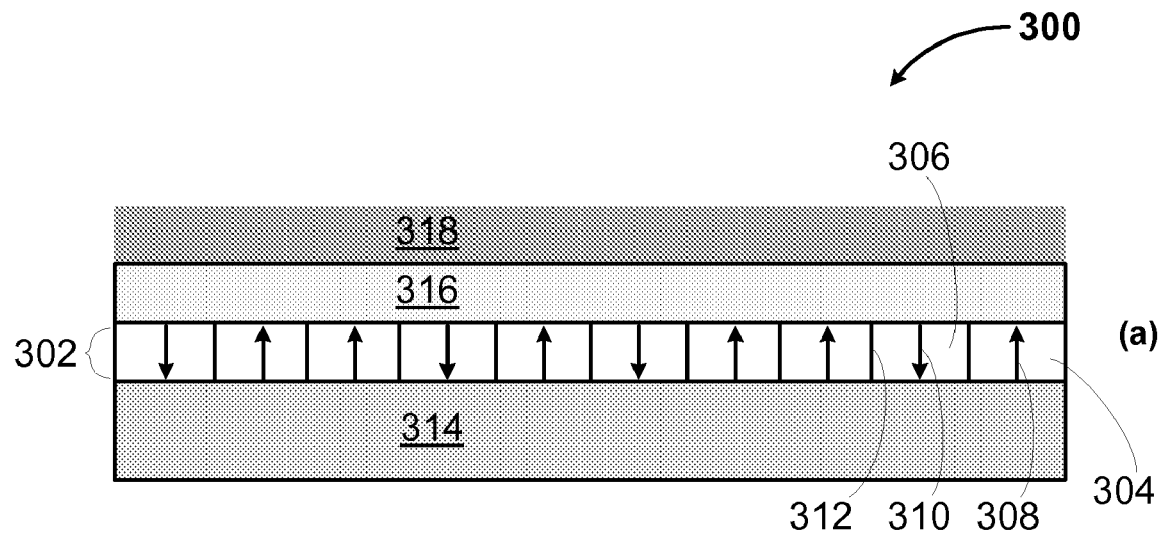
(a)
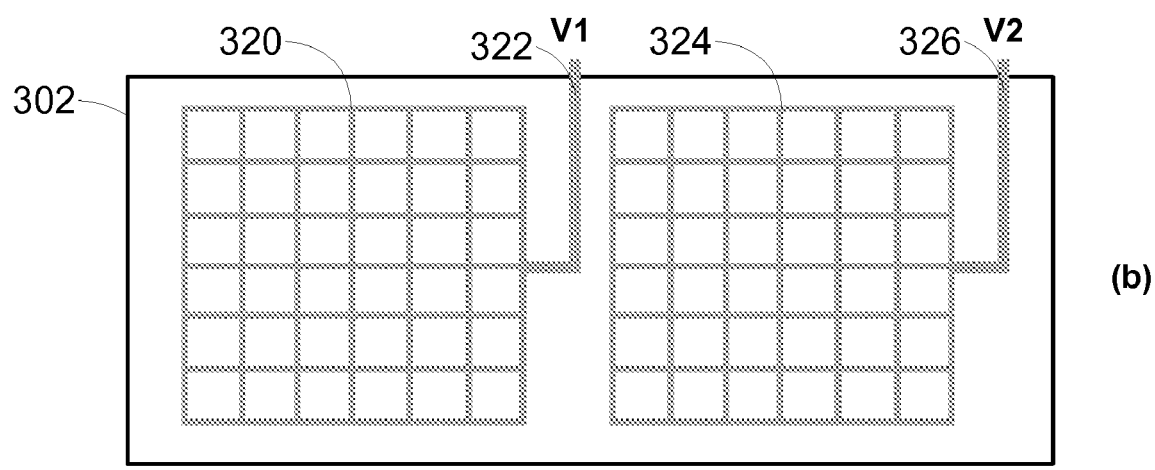
(b)

ental>
USING CONTROLLED BIAS VOLTAGE FOR DATA RETENTION ENHANCEMENT IN A FERROELECTRIC MEDIA

TECHNICAL FIELD

Embodiments of the present invention are generally directed to the field of ferroelectric storage devices and, more particularly, to data retention enhancement in a ferroelectric media.

BACKGROUND

Generally, ferroelectric storage devices are emerging as a viable way to store data. Currently, a variety of mechanisms may cause the loss of data over time. For example, domains that store bits of information may grow or shrink in a way that results in loss of data.

BRIEF DESCRIPTION OF THE DRAWINGS

Embodiments disclosed herein are illustrated by way of example, and not by way of limitation, in the figures of the accompanying drawings in which like reference numerals refer to similar elements and in which:

FIGS. 3a-3b are schematics of another ferroelectric media using data retention enhancement techniques, according to but one embodiment;

Figure 1:
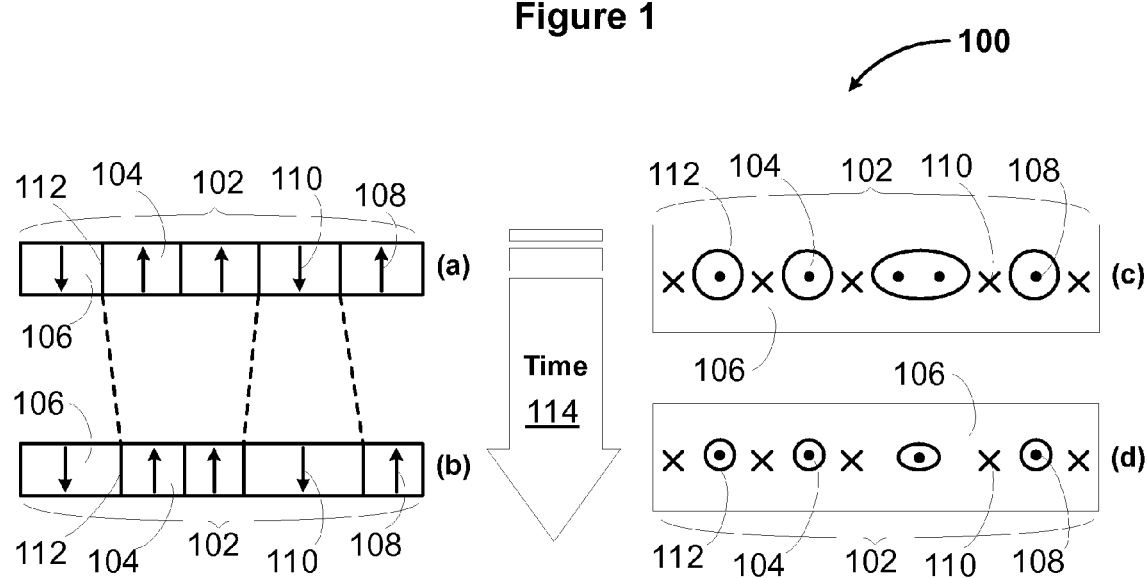
FIGS. 1a-1d depict mechanisms for data loss in a ferroelectric media, according to but one embodiment.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Embodiments of using controlled bias voltage or field for data retention enhancement in a ferroelectric media are described herein. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

FIGS. 1a-1d depict mechanisms for data loss in a ferroelectric media, according to but one embodiment. In an embodiment, a schematic 100 includes a ferroelectric film 102, one or more "up" domains 104, one or more "down" domains 106, electric dipoles in the "up" direction 108, electric dipoles in the "down" direction 110, domain walls 112, and large arrow 114 depicting the passage of time, each coupled as shown. FIGS. 1a-1b may depict a side cross-section view of a ferroelectric media and FIGS. 1c-1d may depict a top-down cross-section view of a ferroelectric media.

In an embodiment according to FIG. 1a, a ferroelectric film 102 includes one or more domains 104, 106 which may be discrete areas within the film 102 to store information. Electric dipoles 108, 110 within the one or more domains 104, 106 may have an "up" direction 108 or a "down" direction 110. In an embodiment, each domain stores a bit of information. For example, a dipole in the "up" direction 108 may correlate with a data value of 1 and a dipole in the "down" direction 110 may correlate with a data value of 0. In one embodiment, data is written to the ferroelectric film 102 using a probe. For example, a seek-and-scan (SSP) probe may be used to write domain 104, 106 values in a probe-based storage media 102.

In an embodiment, a probe has a sharp tip to apply a voltage pulse that creates an electric field across one or more targeted domains 104, 106. An electric field may be generated between the probe tip on one surface of the domain 104, 106 and an electrode coupled to an opposite surface of the domain 104, 106. In an embodiment, a positive applied electric field in the "down" direction writes a "down" domain 106 and a negative applied electric field in the "up" direction writes an "up" domain 104. A "down" domain 106 may be a domain having an electric dipole 110 with a vector in the "down" direction and an "up" domain 104 may be a domain having an electric dipole 108 with a vector in the "up" direction. The dipole vectors 108, 110 may point from negative charge to positive charge.

In an embodiment, each domain 104 is separated from other domains by domain walls 112. Domain walls 112 may not be actual physical boundaries, but may be an interface between ferroelectric material 102 associated with an "up" 108 dipole and a "down" 110 dipole. In one embodiment, the domain walls 110 serve as a distinguishing boundary between "up" domains and "down" domains.

FIG. 1b may be a depiction of FIG. 1a after the passage of time 114. In an embodiment according to FIG. 1b, "up" domains 104 have shrunk in size while the "down" domains have grown in size. Dashed lines between FIG. 1b and FIG. 1a depict how the domain walls 112 between "up" domains 104 and "down" domains 106 may have shifted. A variety of mechanisms may cause the shrinking or growing depicted in FIGS. 1a-1d.

A weak built-in-bias field (BBF) may occur in the ferroelectric media film 102 due to processing imperfections. The BBF may have a field in the "up" or "down" directions and may span across multiple domains 104, 106 in a ferroelectric film 102. In an embodiment according to FIGS. 1a-1b, a BBF having a "down" field causes the "down" domains 106 to grow and the "up" domains 104 to shrink over time 114. In other embodiments, a BBF having an "up" field may cause the "up" domains 104 to gradually grow in size and the "down" domains 106 to shrink over time 114. The BBF may result in a field analogous to that of a field generated when applying a voltage between about −400 mV and +400 mV across the film 102. Excessively small domains may result in loss of data.

In an embodiment according to FIG. 1c, a ferroelectric film 102 includes one or more domains 104, 106 which may be particular areas within the film 102 to store information. FIG. 1c is a top-down depiction of a ferroelectric media 102, in one embodiment. Electric dipoles 108, 110 within the one or more domains 104, 106 may have an "up" direction 108 or a "down" direction 110. In an embodiment, each domain stores a bit of information. For example, a dipole in the "up" direction 108 may correlate with a data value of 1 and a dipole in the "down" direction 110 may correlate with a data value of 0.

In an embodiment, the "up" domains 104 have a domain wall 112 that is circular or elliptical in shape to distinguish "up" domains 104 from "down" domains 106. In an embodiment, the "up" domains have a diameter or width of approximately 10-40 nm, but are not limited in this regard, and may include other dimensions in other embodiments. In another embodiment, the "down" domain 106 includes any region that is not within the "up" domain 104. In other embodiments, the "up" domain 104 includes any region that is not with the "down" domain 106.

FIG. 1d may depict FIG. 1c after the passage of time 114 or after thermally activated processes. In an embodiment, the domain walls 112 have shrunk resulting in effectively smaller "up" domains 104 and larger "down" domains 106. Such shrinking may result in loss of data. For example, the adjacent "up" domains in FIG. 1c originally represent two bits of data (i.e. —two adjacent 1's). After shrinking in FIG. 1d, the adjacent "up" domains have effectively merged, resulting in the loss of a bit of data.

FIGS. 1c-d may depict another mechanism that affects data retention. Domain walls 112 or interfaces between "up" 104 and "down" 106 domains may have excess energy. An increase in temperature or a thermally activated process may gradually reduce the total domain wall 112 area to reduce free energy of the system. In an embodiment, the rate of shrink accelerates with reduction of domain wall 112 diameter or width. An increase in temperature may accelerate the rate of shrink.

Figure 2:
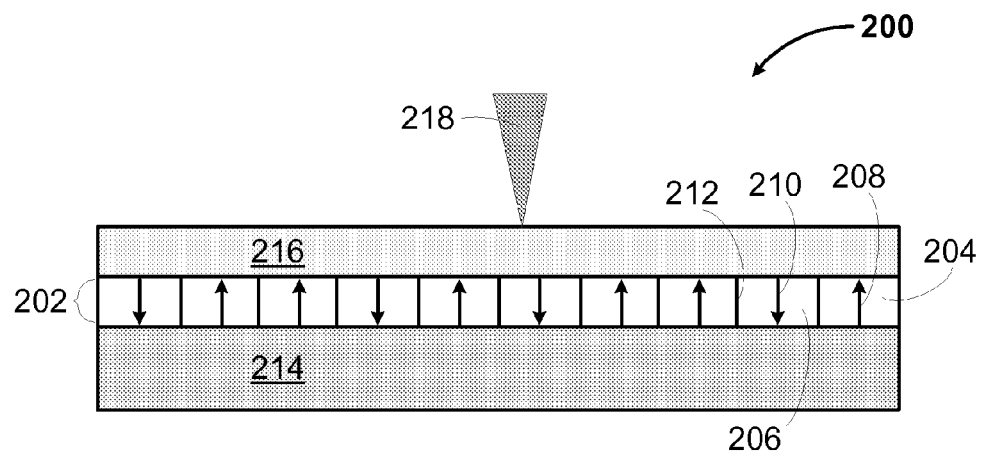
FIG. 2 is a schematic of a ferroelectric media using data retention enhancement techniques, according to but one embodiment.

FIG. 2 is a schematic of a ferroelectric media using data retention enhancement techniques, according to but one embodiment. In an embodiment, an apparatus 200 includes a ferroelectric film 202, one or more "up" domains 204, one or more "down" domains 206, electric dipoles pointing "up" 208, electric dipoles pointing "down" 210, domain walls 212, electrode 214, and electrically conductive thin film 216, each coupled as shown. A probe tip 218 such as a seek-and-scan probe (SSP) may be used to apply a voltage to the one or more domains 204, 206 of the ferroelectric film 202.

An apparatus 200 may include a ferroelectric film 202 having a first surface and a second surface, the first surface being opposite the second surface, an electrode 214 coupled with the first surface, and an electrically conductive thin film 216 coupled with the second surface. In an embodiment, the electrically conductive thin film 216 is sufficiently conductive that a controlled bias field applied between the electrically conductive thin film 216 and the electrode 214 is sufficient to grow, shrink, or actively maintain the size of the one or more domains 204, 206 disposed between the electrically conductive thin film and the electrode.

In an embodiment, an electrically conductive thin film 216 is sufficiently thin to allow reading or writing of the one or more domains 204, 206 through the electrically conductive thin film 216. Reading or writing may be accomplished using a probe tip 218, for example. The electrically conductive thin film 216 is about 1-5 nm thick according to an embodiment, but is not limited in this regard, and other thicknesses may be suitable in other embodiments. In another embodiment, an electrically conductive thin film 216 has a low carrier density such that the thin film 216 thickness is smaller than the Thomas-Fermi length of the film 216 material. An electrically conductive thin film 216 may include materials such as strontium ruthenium oxide (SRO), metals such as platinum, for example, or any other suitably conductive material that accords with embodiments described herein. An electrically conductive thin film 216 may be deposited by any suitable method including atomic layer deposition (ALD), physical vapor deposition (PVD), chemical vapor deposition (CVD), or combinations thereof.

In an embodiment, a probe tip 218 is applied directly to a ferroelectric film 202 that is not coupled to an electrically conductive thin film 216. A probe tip 218 may be brought into contact with the ferroelectric film 202 to apply a controlled bias field across one or more domains 204, 206 that is sufficient to grow, shrink, or actively maintain the size of one or more domains 204, 206. In an embodiment, a scanning probe 218 provides a counterbalancing bias field to one or more domains 204, 206 by direct application of the tip 218 to the film 202. The shrink or growth rate of the one or more domains 204, 206 may be empirically known. A maintenance scan using the probe 218 may be regularly scheduled to provide a counterbalancing bias field to grow or shrink domains 204, 206 to a desired size. In another embodiment, a counterbalancing bias is provided as needed. For example, the domain 204, 206 size may be estimated by performing read sampling to determine whether a counterbalancing bias is needed.

An apparatus 200 having an electrically conductive thin film 216 may provide a benefit over an apparatus not having an electrically conductive thin film 216 in that the film 216 may allow the simultaneous application of a controlled bias voltage across many more domains 204, 206 than if applied by only a probe tip 218. In this regard, a ferroelectric film 202 coupled with an electrically conductive thin film 216 may require much less time to grow or shrink the domains 204, 206 to a desired size. A desired size may include a size according to design specifications, or a size that enhances data retention in a ferroelectric media 202. Another benefit of using an electrically conductive thin film 216 to apply a controlled bias field is that a domain 204, 206 can be actively maintained at a desired size by providing a substantially constant counterbalancing bias field to prevent the domain 204, 206 from shrinking, growing, or otherwise deviating from a desired size.

In an embodiment, one or more "up" domains 204 are enlarged by applying a negative bias voltage or reduced by applying positive a bias voltage. Bias voltage may be calculated by subtracting the potential at the first (i.e. —bottom) surface of the ferroelectric film 202 from the potential at the second (i.e. —top) surface of the ferroelectric film 202. In another embodiment, one or more "down" domains 206 are enlarged by applying a positive bias voltage or reduced by applying a negative bias voltage.

In an embodiment, a controlled bias field is applied to one or more domains 204, 206 by coupling the electrically conductive thin film 216 to a voltage source. In an embodiment, electrically conductive thin film 216 is patterned into a mesh. A mesh 216 may allow a probe 218 to read or write to the domains 204, 206 without any intervening electrically conductive thin film 216 material to jeopardize the read or write ability of the probe 218. In an embodiment, an electrically conductive thin film 216 includes one or more mesh structures that allow one or more respective controlled bias voltages to be applied through the one or more meshes 216 to grow, shrink, or actively maintain the one or more domains 204, 206 to enhance data retention in a ferroelectric storage device 200.

A ferroelectric film 202 may include any suitable ferroelectric or piezoelectric material for data storage applications such as memory, for example. In an embodiment, a ferroelectric film 202 includes lead zirconium titanate (PZT), barium titanate oxide, rare-earth titanate oxides, or any suitable material. In an embodiment, a ferroelectric film 202 is a single crystal ferroelectric film for high-density bits. For example, a ferroelectric film 202 may be capable of hosting at least about 10,000 bits per square micron, in an embodiment.

An electrode 314 may include any suitable electrically conductive material that accords with embodiments described herein. In an embodiment, an electrode includes strontium ruthenium oxide (SRO) or doped strontium titanate (STO) such as Nb-doped STO. In an embodiment, the dopant includes any dopant that increases the conductivity of the STO. In an embodiment, the electrode 314 is connected to ground or about ground voltages. In other embodiments, the electrode 314 is coupled to a voltage source that supplies any suitable voltage that accords with embodiments described herein.

FIGS. 3a-3b are schematics of another ferroelectric media using data retention enhancement techniques, according to but one embodiment. FIG. 3a may be a cross-section depiction of a ferroelectric media 300 and FIG. 3b may be a top-down depiction of a ferroelectric media 300.

In an embodiment according to FIG. 3a, an apparatus 300 includes a ferroelectric film 302, one or more "up" domains 304, one or more "down" domains 306, electric dipoles pointing "up" 308, electric dipoles pointing "down" 310, domain walls 312, electrode 314, electrically conductive thin film 316, and one or more electrically conductive mesh structures 318, each coupled as shown. In an embodiment according to FIG. 3b, an apparatus 300 includes a ferroelectric media 302 and one or more electrically conductive mesh structures 320, 324 coupled with their respective voltage sources 322, 326, each coupled as shown.

In an embodiment, an electrically conductive mesh structure 318, 320, 324 is coupled to the electrically conductive thin film 316 to supply bias voltage to grow, shrink, or actively maintain the one or more domains to a desired size. In another embodiment, the mesh 318, 320, 324, has openings that allow a probe to perform read or write operations on the one or more domains 304, 306. A combined mesh 318 and electrically conductive thin film 316 may eliminate the need for a tip scan for maintenance. Such benefit may reduce potential tip wear issues and allow a counterbalancing bias to be applied in the background of other operations using the tip.

In an embodiment, multiple meshes 320, 324 are utilized to apply a controlled bias voltage according to localized needs of the ferroelectric film 302 or the one or more domains 304, 306. For example, uniformity variations or temperature differences across the media 302 may result in different biasing needs for domain-size maintenance. Multiple meshes 320, 324 may be coupled to voltage sources 322, 326 where V1 322 and V2 326 have different voltages to address these localized needs.

In an embodiment, one or more electrically conductive mesh structures 320, 324 are coupled to an electrically conductive thin film 316 to supply bias voltage to grow, shrink, or actively maintain the one or more domains 304, 306 to a desired size. In another embodiment, the electrically conductive mesh structures 320, 324 have openings in the mesh structures to allow a seek-and-scan probe to perform read or write operations on the one or more domains. The mesh structures 320, 324 may be sized such that each square or rectangle opening in the mesh has a length of about 1 to 10 microns, but is not necessarily limited in this regard, and may be sized to suit various needs.

Figure 4:
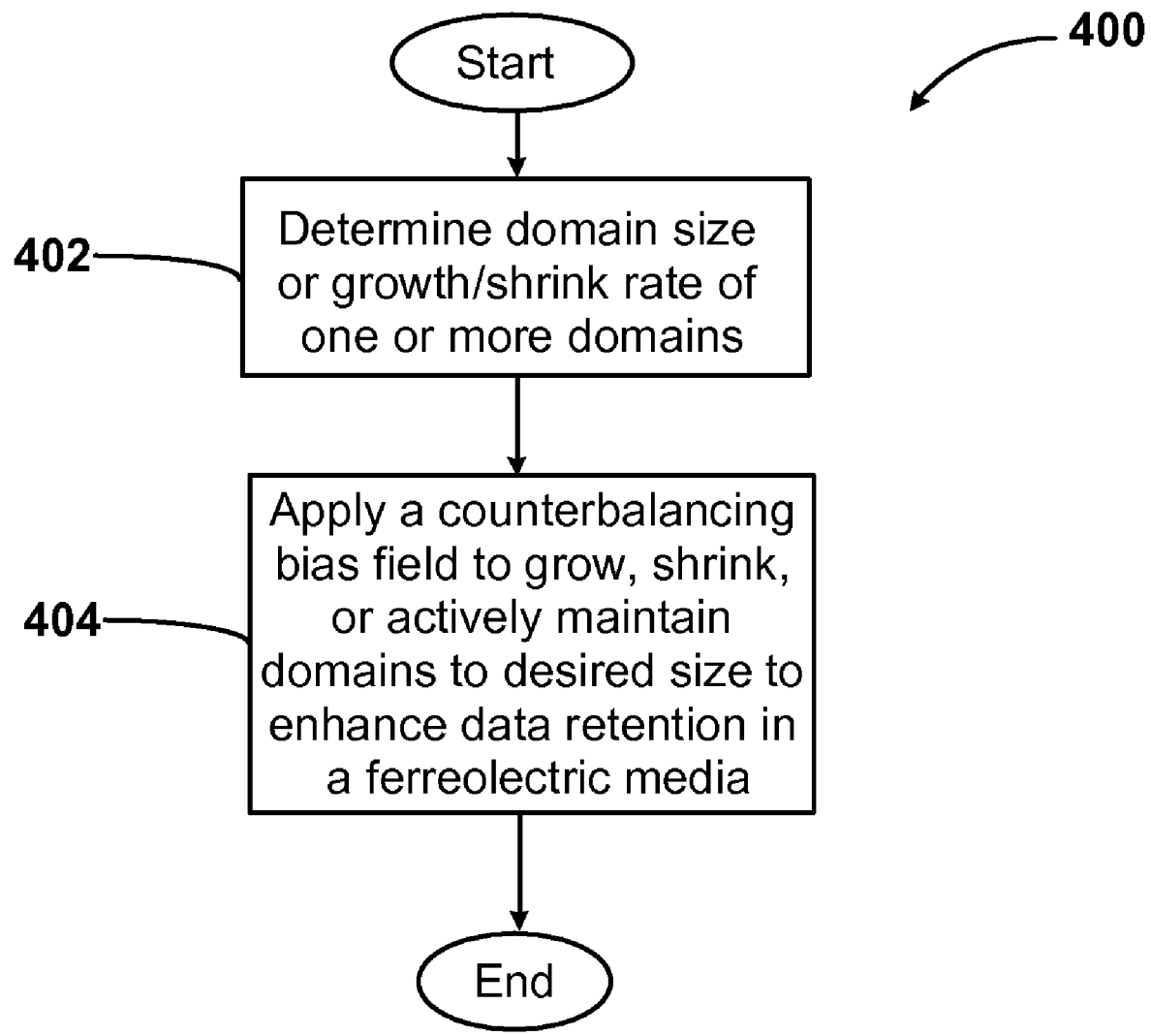
FIG. 4 is a flow diagram of a method for enhancing data retention in a ferroelectric media, according to but one embodiment.

FIG. 4 is a flow diagram of a method for enhancing data retention in a ferroelectric media, according to but one embodiment. In an embodiment, a method 400 includes determining domain size or growth/shrink rate of one or more domains 402 and applying a counterbalancing bias field to grow, shrink, or actively maintain the one or more domains to a desired size to enhance data retention in a ferroelectric media 404.

In an embodiment, a method 400 includes determining the size of one or more domains in a ferroelectric media 402, the ferroelectric media having a first surface and a second surface, the first surface being opposite the second surface wherein the first surface is coupled with an electrode, and applying a controlled bias field to the one or more domains 404 to grow, shrink, or actively maintain the size of the one or more domains.

Determining the size of one or more domains 402 in a ferroelectric media may include empirically measuring the growth or shrink rate of the domains to estimate the domain size at a particular time. In another embodiment, determining the size of one or more domains 402 in a ferroelectric media includes measuring the signal strength of an up domain and an adjacent down domain (i.e. —by read sampling) at a first time to provide a first ratio of the up domain signal strength to the adjacent down domain signal strength, measuring the signal strength of the up domain and the adjacent down domain at a second time to provide a second ratio of the up domain signal strength to the adjacent down domain signal strength, and comparing the first ratio with the second ratio to determine whether the up or the adjacent down domains are relatively growing or shrinking. A difference in magnitude between the first ratio and the second ratio may correlate with a well-calibrated or empirically derived size change estimate for the up or the adjacent down domain.

Applying a controlled bias field to the one or more domains 404 may include applying a controlled bias voltage through an electrically conductive structure coupled to the second surface of the ferroelectric media to generate a controlled bias field between the electrically conductive structure and the electrode, the one or more domains being disposed between the electrically conductive structure and the electrode. In an embodiment, applying a controlled bias voltage includes applying a controlled bias voltage between about 400 mV and −400 mV, but is not limited to these voltages, and may include other suitable voltages in other embodiments. In another embodiment, applying a controlled bias voltage includes applying a negative bias voltage to grow one or more "up" domains, applying a positive bias voltage to shrink one or more "up" domains, applying a negative bias voltage to shrink one or more "down" domains, applying a positive bias to grow one or more "down" domains, or suitable combinations thereof.

In another embodiment, applying a controlled bias field to the one or more domains 404 includes using a probe to locally apply a controlled bias voltage to the second surface of the ferroelectric media to generate a controlled bias field between the probe and the electrode, the one or more domains being disposed between the probe and the electrode. Applying a controlled bias field to the one or more domains 404 may include applying a controlled bias field according to a predetermined schedule to grow or shrink the one or more domains to a desired size. In another embodiment, applying a controlled bias field 404 includes applying a substantially constant controlled bias field to actively maintain the one or more domains at a desired size or applying a controlled bias field as needed to grow, shrink, or maintain the size of one or more domains, or combinations thereof.

Various operations may be described as multiple discrete operations in turn, in a manner that is most helpful in understanding the invention. However, the order of description should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Figure 5:
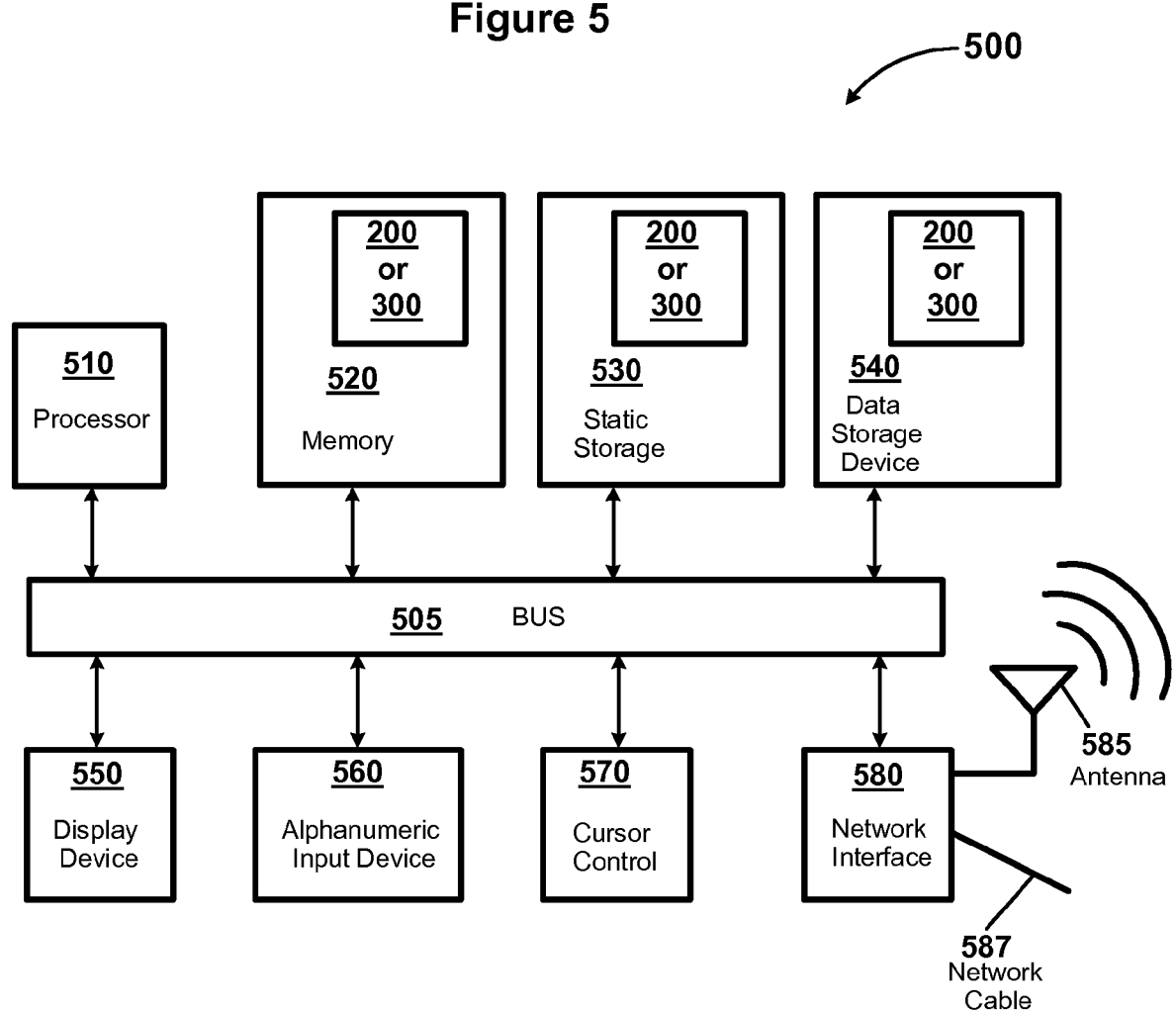
FIG. 5 is a schematic of an example system in which embodiments of the present invention may be used, according to but one embodiment.

FIG. 5 is a diagram of an example system in which embodiments of the present invention may be used, according to but one embodiment. System 500 is intended to represent a range of electronic systems (either wired or wireless) including, for example, desktop computer systems, laptop computer systems, personal computers (PC), wireless telephones, personal digital assistants (PDA) including cellular-enabled PDAs, set top boxes, pocket PCs, tablet PCs, DVD players, or servers, but is not limited to these examples and may include other electronic systems. Alternative electronic systems may include more, fewer and/or different components.

In one embodiment, electronic system 500 includes an apparatus 200, 300 incorporating mechanisms for using controlled bias voltage for data retention enhancement in accordance with embodiments described with respect to FIGS. 1-4. In an embodiment, an apparatus 200, 300 incorporating mechanisms for using controlled bias voltage for data retention enhancement as described herein is part of an electronic system's memory 520, static storage 530, or data storage device 540.

Electronic system 500 may include bus 505 or other communication device to communicate information, and processor 510 coupled to bus 505 that may process information. While electronic system 500 may be illustrated with a single processor, system 500 may include multiple processors and/or co-processors. System 500 may also include random access memory (RAM) or other storage device 520 (may be referred to as memory), coupled to bus 505 and may store information and instructions that may be executed by processor 510.

Memory 520 may also be used to store temporary variables or other intermediate information during execution of instructions by processor 510. Memory 520 is a flash memory device in one embodiment. In another embodiment, memory 520 includes an apparatus 200, 300 incorporating mechanisms for using controlled bias voltage for data retention enhancement as described herein.

System 500 may also include read only memory (ROM) and/or other static storage device 530 coupled to bus 505 that may store static information and instructions for processor 510. In an embodiment, static storage device 530 includes an apparatus 200, 300 incorporating mechanisms for using controlled bias voltage for data retention enhancement as described herein. Data storage device 540 may be coupled to bus 505 to store information and instructions. Data storage device 540 such as a magnetic disk or optical disc and corresponding drive may be coupled with electronic system 500. In an embodiment, data storage device 540 includes an apparatus 200, 300 incorporating mechanisms for using controlled bias voltage for data retention enhancement as described herein.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Another type of user input device is cursor control 570, such as a mouse, a trackball, or cursor direction keys to communicate information and command selections to processor 510 and to control cursor movement on display 550.

Electronic system 500 further may include one or more network interfaces 580 to provide access to network, such as a local area network. Network interface 580 may include, for example, a wireless network interface having antenna 585, which may represent one or more antennae. Network interface 580 may also include, for example, a wired network interface to communicate with remote devices via network cable 587, which may be, for example, an Ethernet cable, a coaxial cable, a fiber optic cable, a serial cable, or a parallel cable.

In one embodiment, network interface 580 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

In addition to, or instead of, communication via wireless LAN standards, network interface(s) 480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In an embodiment, a system 500 includes one or more omnidirectional antennae 585, which may refer to an antenna that is at least partially omnidirectional and/or substantially omnidirectional, and a processor 510 coupled to communicate via the antennae.

The above description of illustrated embodiments, including what is described in the Abstract, is not intended to be exhaustive or to limit to the precise forms disclosed. While specific embodiments and examples are described herein for illustrative purposes, various equivalent modifications are possible within the scope of this description, as those skilled in the relevant art will recognize.

These modifications can be made in light of the above detailed description. The terms used in the following claims should not be construed to limit the scope to the specific embodiments disclosed in the specification and the claims. Rather, the scope of the embodiments disclosed herein is to be determined entirely by the following claims, which are to be construed in accordance with established doctrines of claim interpretation.

The above description of illustrated embodiments, including what is described in the Abstract, is not intended to be exhaustive or to limit to the precise forms disclosed. While specific embodiments and examples are described herein for illustrative purposes, various equivalent modifications are possible within the scope of this description, as those skilled in the relevant art will recognize.

These modifications can be made in light of the above detailed description. The terms used in the following claims should not be construed to limit the scope to the specific embodiments disclosed in the specification and the claims. Rather, the scope of the embodiments disclosed herein is to be determined entirely by the following claims, which are to be construed in accordance with established doctrines of claim interpretation.

What is claimed is:

1. An apparatus, comprising:
a ferroelectric film comprising one or more domains, the ferroelectric film comprising a first surface and a second surface, the first surface being opposite the second surface;
an electrode coupled with the first surface;
an electrically conductive thin film coupled with the second surface, the electrically conductive thin film being sufficiently conductive that a controlled bias field applied between the electrically conductive thin film and the electrode is sufficient to grow, shrink, or actively maintain a size of the one or more domains disposed between the electrically conductive thin film and the electrode; and
one or more electrically conductive mesh structures coupled to the electrically conductive thin film to supply bias voltage to grow, shrink, or actively maintain the one or more domains to a desired size, the electrically conductive mesh structures comprising openings in the mesh structures to allow a seek-and-scan probe to perform read or write operations on the one or more domains.

2. An apparatus according to claim 1, wherein the electrically conductive thin film is sufficiently thin to allow reading or writing of the one or more domains through the electrically conductive thin film.

3. An apparatus according to claim 1, wherein the electrically conductive thin film has a low carrier density such that the thin film thickness is smaller than the Thomas-Fermi length of the thin film material.

4. An apparatus according to claim 1, wherein the electrically conductive thin film is about 1-5 nm thick.

5. An apparatus according to claim 1, wherein the electrically conductive thin film comprises strontium ruthenium oxide (SRO), platinum, or a combination thereof, wherein the ferroelectric film comprises lead zirconium titanate (PZT), barium titanate oxide, rare earth titanate oxides, or combinations thereof, and wherein the electrode comprises SRO, or doped strontium titanate (STO), or a combination thereof.

6. An apparatus according to claim 1, wherein the electrically conductive thin film comprises one or more electrically conductive mesh structures that allow one or more respective bias voltages to be applied through the one or more mesh structures to grow, shrink, or actively maintain the one or more domains to enhance data retention in a ferroelectric storage device.

7. A method, comprising:
determining a size of one or more domains in a ferroelectric media by measuring a growth or shrink rate of the domains to estimate the domain size at any time, the ferroelectric media comprising a first surface and a second surface, the first surface being opposite the second surface, and the first surface being coupled with an electrode; and
in response to said determining, applying a controlled bias field to the one or more domains to grow, shrink, or actively maintain the size of the one or more domains to enhance data retention in the ferroelectric media.

8. A method according to claim 7, wherein applying the controlled bias field to the one or more domains comprises:
applying the controlled bias voltage through an electrically conductive structure coupled to the second surface of the ferroelectric media to generate a controlled bias field between the electrically conductive structure and the electrode, the one or more domains being disposed between the electrically conductive structure and the electrode.

9. A method according to claim 8, wherein applying the controlled bias voltage comprises applying a controlled bias voltage between about 400 mV and −400 mV.

10. A method according to claim 8, wherein applying the controlled bias voltage comprises:
applying a negative bias voltage to grow the one or more domains wherein the one or more domains are up domains, applying a positive bias voltage to shrink the one or more domains wherein the one or more domains are up domains, applying a negative bias voltage to shrink the one or more domains wherein the one or more domains are down domains, or applying a positive bias to grow the one or more domains wherein the one or more domains are down domains, or suitable combinations thereof.

11. A method according to claim 7, wherein applying the controlled bias field to the one or more domains comprises:
using a probe to locally apply a controlled bias voltage to the second surface of the ferroelectric media to generate a controlled bias field between the probe and the electrode, the one or more domains being disposed between the probe and the electrode.

12. A method according to claim 7, wherein applying the controlled bias field to the one or more domains comprises applying the controlled bias field according to a pre-determined schedule to grow or shrink the one or more domains to a desired size, applying a substantially constant controlled bias field to actively maintain the one or more domains at a desired size, or applying the controlled bias field as needed to grow, shrink, or maintain the size of one or more domains, or suitable combinations thereof.

13. A method, comprising:
determining the size of one or more domains in a ferroelectric media, the ferroelectric media comprising a first surface and a second surface, the first surface being opposite the second surface, and the first surface being coupled with an electrode, wherein determining the size of one or more domains in a ferroelectric media comprises:
measuring the signal strength of an up domain and an adjacent down domain at a first time to provide a first ratio of the up domain signal strength to the adjacent down domain signal strength;
measuring the signal strength of the up domain and the adjacent down domain at a second time to provide a second ratio of the up domain signal strength to the adjacent down domain signal strength; and comparing the first ratio with the second ratio to determine whether the up or the adjacent down domains are growing or shrinking wherein a difference in magnitude between the first ratio and second ratio correlates with a size change estimate for the up or the adjacent down domain; and in response to said determining, applying a controlled bias field to the one or more domains to grow, shrink, or actively maintain the size of the one or more domains to enhance data retention in the ferroelectric media.

14. A method according to claim 13, wherein applying the controlled bias field to the one or more domains comprises:

applying the controlled bias voltage through an electrically conductive structure coupled to the second surface of the ferroelectric media to generate a controlled bias field between the electrically conductive structure and the electrode, the one or more domains being disposed between the electrically conductive structure and the electrode.

15. A method according to claim 14, wherein applying the controlled bias voltage comprises applying a controlled bias voltage between about 400 mV and −400 mV.

16. A method according to claim 14, wherein applying the controlled bias voltage comprises:

applying a negative bias voltage to grow the one or more domains wherein the one or more domains are up domains, applying a positive bias voltage to shrink the one or more domains wherein the one or more domains are up domains, applying a negative bias voltage to shrink the one or more domains wherein the one or more domains are down domains, or applying a positive bias to grow the one or more domains wherein the one or more domains are down domains, or suitable combinations thereof.

17. A method according to claim 13, wherein applying the controlled bias field to the one or more domains comprises:

using a probe to locally apply a controlled bias voltage to the second surface of the ferroelectric media to generate a controlled bias field between the probe and the electrode, the one or more domains being disposed between the probe and the electrode.

18. A method according to claim 13, wherein applying the controlled bias field to the one or more domains comprises applying the controlled bias field according to a pre-determined schedule to grow or shrink the one or more domains to a desired size, applying a substantially constant controlled bias field to actively maintain the one or more domains at a desired size, or applying the controlled bias field as needed to grow, shrink, or maintain the size of one or more domains, or suitable combinations thereof.

* * * * *